(12) United States Patent
Suwa et al.

(10) Patent No.: US 6,772,425 B1
(45) Date of Patent: Aug. 3, 2004

(54) DISC PLAYER MOUNTED ON VEHICLE

(75) Inventors: Takafumi Suwa, Tanashi (JP); Shoji Tomioka, Sagamihara (JP); Tsutomu Imai, Ohme (JP); Yosuke Haga, Ohmiya (JP); Takeharu Sasada, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/486,005

(22) PCT Filed: Aug. 12, 1998

(86) PCT No.: PCT/JP98/03605

§ 371 (c)(1),
(2), (4) Date: Feb. 18, 2000

(87) PCT Pub. No.: WO99/10890

PCT Pub. Date: Mar. 4, 1999

(30) Foreign Application Priority Data

Aug. 22, 1997 (JP) ............................................... 9-242154
Oct. 17, 1997 (JP) ............................................... 9-303487

(51) Int. Cl.$^7$ ............................................... G11B 17/04
(52) U.S. Cl. ............................................... 720/619
(58) Field of Search ............................... 369/263, 75.1, 369/75.2, 77.1, 77.2; 360/99.02, 99.03, 99.06, 99.07

(56) References Cited

U.S. PATENT DOCUMENTS 4,815,065 A * 3/1989 Rouws ...................... 369/77.2
5,010,428 A * 4/1991 d'Alayerde Costemore d'Arc. .... 360/99.06
5,166,918 A 11/1992 Kamijo ........................ 369/77.1
5,537,377 A * 7/1996 Takai et al. ................. 369/77.2
6,169,720 B1 * 1/2001 Kamemura et al. ........ 369/75.2

FOREIGN PATENT DOCUMENTS

| EP | 0 148 553 | | 7/1985 |
| JP | 60-38753 | | 2/1985 |
| JP | 63-146269 | | 6/1988 |
| JP | 64-8546 | | 1/1989 |
| JP | 62-195755 | | 8/1989 |
| JP | 3-292665 | | 12/1991 |
| JP | 4-10271 | | 1/1992 |
| JP | 4-21946 | | 1/1992 |
| JP | 4-362563 | | 12/1992 |
| JP | 6-103674 | | 4/1994 |
| JP | 08180537 A | * | 7/1996 |
| JP | 10-199086 | | 7/1998 |
| JP | 10-199087 | | 7/1998 |

* cited by examiner

Primary Examiner—Tianjie Chen
(74) Attorney, Agent, or Firm—Eric J. Robinson; Robinson Intellectual Property Law Office

(57) ABSTRACT

A vehicle mount disc player having a small thickness by removing a wasteful space around a reproduction unit chassis when a disc is loaded or unloaded. The vehicle mount disc player has the reproduction unit chassis supported in a floating state by a main chassis via damper mechanisms. The reproduction unit chassis is locked so as to be shifted to a disc motor side along an axial direction of a disc motor and a turntable when the disc is loaded or unloaded.

8 Claims, 4 Drawing Sheets

DISC PLAYER MOUNTED ON VEHICLE

BACKGROUND OF THE INVENTION

1. Field of the Invention

The present invention relates to a vehicle mount disc player whose reproduction unit chassis is supported in a floating state by damper mechanisms, and more particularly to a lock position of the reproduction unit when a disc is loaded or unloaded, and to a disc loading/unloading mechanism.

2. Description of the Related Art

An example of a conventional vehicle mount disc player whose reproduction unit chassis is supported in a floating state on a main chassis by damper mechanisms, will be described with reference to FIGS. 7A and 7B. FIG. 7A illustrates a reproduction state of a disc 6, and FIG. 7B illustrates a loading or unloading state of the disc 6.

A reproduction unit 1 shown in FIGS. 7A and 7B supports a pickup 1c and a disc motor 1a. A turntable 1b fixed to a rotary shaft of the disc motor 1a supports the disk 6 which is rotated by the disc motor 1a. The pickup 1c is transported in a disc radial direction by a pickup transport unit (not shown) supported by the reproduction unit chassis 1. In the above manner, the reproduction unit chassis 1 supports mechanisms necessary for the reproduction of a disc. In order to prevent external vibrations from being transmitted to the reproduction unit chassis 1, the chassis 1 is supported by side walls 5 of the main chassis via damper mechanisms 2 constituted of coil springs and dampers.

In the reproduction state shown in FIG. 7A, the reproduction unit chassis 1 is supported in a floating state by the damper mechanisms 2 and moves relative to the main chassis. In order to allow a sufficient relative motion of the reproduction unit chassis 1, the chassis 1 is disposed in its natural state by providing upper and lower spaces A and B.

As shown in FIG. 7B, when the disc 6 is loaded or unloaded, a lock mechanism 3 fixes the reproduction unit chassis 1 at a neutral position of the damper mechanisms 2 and a disc loading/unloading mechanism 4 is raised to load or unload the disc 6 so that the disc 6 does not abut on a projection supported by the reproduction unit chassis 1 such as the turntable 1b while the disc 6 is transported.

In the conventional vehicle mount disc player described above, when the disc 6 is loaded or unloaded, the reproduction unit chassis 1 is fixed at the neutral position of the damper mechanisms 2. Therefore, the lower space B under the reproduction unit chassis 1 becomes a wasteful space and the disc player cannot be thinned.

An example of the disc loading/unloading mechanism of a conventional vehicle mount disc player is shown in FIG. 8. A disc recording/reproducing unit is supported by a floating chassis (reproduction unit chassis) which is supported by a main chassis via unrepresented damper mechanisms.

A housing (main chassis) 52 has a fixed disc guide 53 extending inward from a disc insert port 52a. A disc 51 inserted into the disc insert port 52a is transported to a recording/reproducing position by an unrepresented feed roller, or the disc 6 at the recording/reproducing position is transported to a position extending outward from the disc insert port 52a.

A disc used with the vehicle mount disc player is accommodated in a cartridge on which a shutter 58 is mounted in a slidable state as shown in FIG. 9. The shutter 58 opens and closes a window of the cartridge. In some state, the end of the shutter 58 becomes open and extends downward from the cartridge bottom surface by a distance C' shown in FIG. 9. Therefore, as shown in FIG. 8, the fixed disc guide 53 and a floating disc guide 54 are each provided with slanted guide portions 53a and 55 to smoothly guide the disc 6.

With the conventional disc loading/unloading mechanism described above, the slanted guide portions 53a and 55 are disposed facing each other. It is therefore necessary to set a distance B' shown in FIG. 8 between opposing ends of the slanted guide portions 53a and 55 in order to allow a motion stroke of the floating chassis. The distance of transporting the disc 6 becomes long and the depth of the apparatus becomes large.

SUMMARY OF THE INVENTION

It is an object of the present invention to provide a vehicle mount disc player whose height is made low by removing a wasteful space in a disc loading/unloading state.

It is another object of the present invention to provide a disc loading/unloading mechanism for a vehicle mount disc player capable of shortening a depth of the player and of shortening a disc transport distance.

According one aspect of the present invention, a vehicle mount disc player having a reproduction unit chassis supported in a floating state by a main chassis via damper mechanisms, is provided wherein the reproduction unit chassis is locked being shifted to a turntable side relative to the main chassis along an axial direction of a clamper and a turntable when a disc is loaded or unloaded.

In the vehicle mount disc player, a disc loading/unloading mechanism may be moved to a damper side relative to the main chassis along the axial direction of the clamper and the turntable when a disc is loaded or unloaded.

According to another aspect of the present invention, a disc loading/unloading mechanism for loading/unloading a disc by guiding the disc along a fixed disc guide fixed to a housing and a floating disc guide fixed to a floating chassis, is provided wherein a slanted guide portion of the fixed disc guide and slanted guide portions of the floating disc guide are disposed at different positions along a direction perpendicular to a disc transport direction and at overlapping positions along the disc transport direction, the slanted guide portions being spaced apart by a distance allowing a motion stroke of the floating chassis.

In the disc loading/unloading mechanism, another slanted guide portion is provided having a large slant angle or a shorter length than a slant angle or a length of each of the slanted guide portions disposed at different positions along a direction perpendicular to a disc transport direction, the other slanted guide portion being disposed spaced apart from an opposing slanted guide portion by a distance allowing a motion stroke of the floating chassis.

DETAILED DESCRIPTION OF THE PREFERRED EMBODIMENTS

Figure 1A:
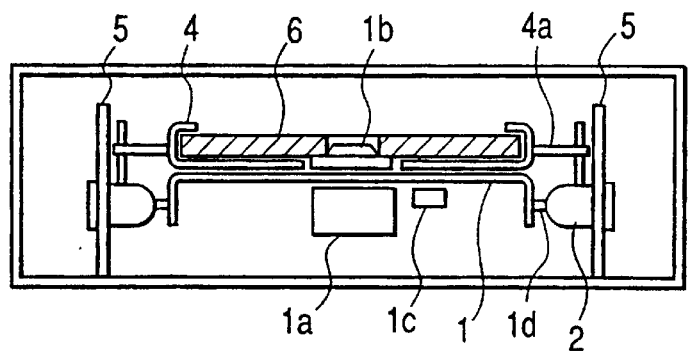
FIGS. 1A to 1C are schematic cross sectional views showing the structure of a vehicle mount disc player according to a first embodiment of the invention.
Figure 1B:
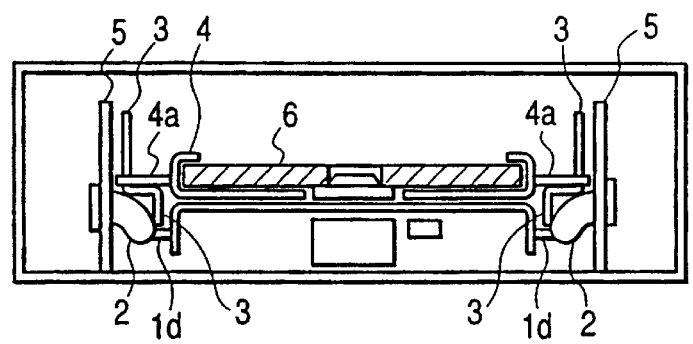
Figure 1C:
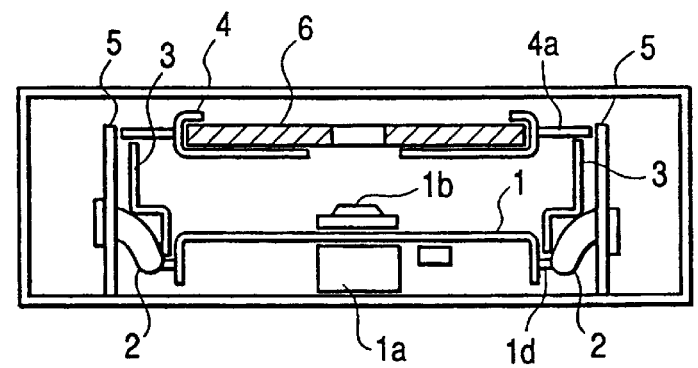

A vehicle mount disc player according to an embodiment of the invention, will be described with reference to the accompanying drawings. FIGS. 1A to 1C are schematic cross sectional views showing the structure of a vehicle mount disc player according to a first embodiment of the invention. FIG. 1A illustrates a reproduction state of a disc 6, and FIG. 1C illustrates a loading or unloading state of the disc 6. FIG. 1B illustrates a transition state from the reproduction state to the loading or unloading state.

Figure 7A:
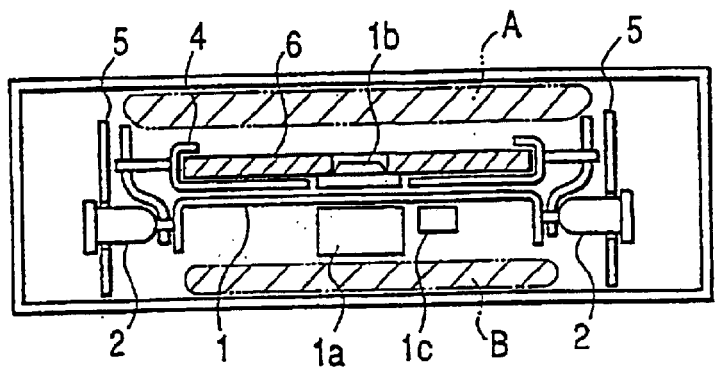
FIGS. 7A and 7B are cross sectional views of a conventional vehicle mount disc player.
Figure 7B:
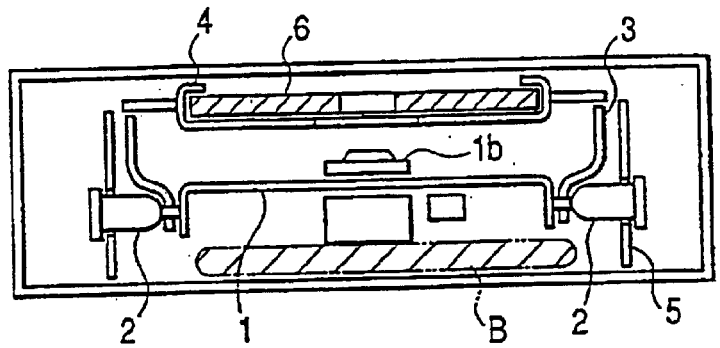
Figure 8:
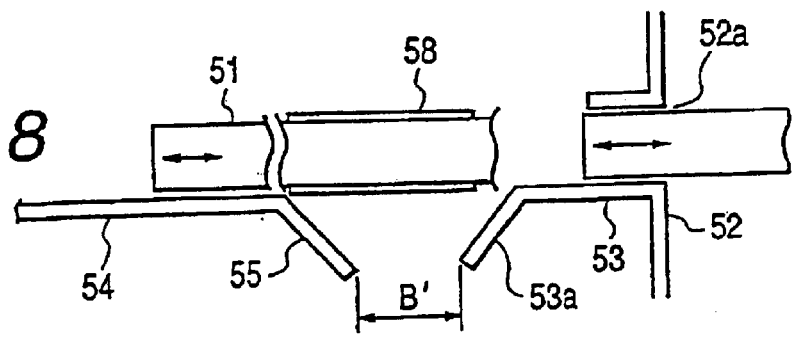
FIG. 8 is a cross sectional view showing another example of the disc loading/unloading mechanism.

A reproduction unit 1 shown in FIGS. 7A to 7C supports mechanisms such as a pickup 1c and a disc motor 1a necessary for the reproduction of the disc, as described with the conventional disc player. In order to prevent external vibrations from being transmitted to the reproduction unit chassis 1, the chassis 1 is supported by side walls 5 of the main chassis via damper mechanisms 2 constituted of coil springs and dampers.

In the reproduction state shown in FIG. 1A, the reproduction unit chassis 1 is supported in a floating state by the damper mechanisms 2 and moves relative to the main chassis. In order to allow a sufficient relative motion of the reproduction unit chassis 1, the chassis 1 is disposed in its natural state generally at the center position of the main chassis.

As shown in FIG. 1B, when the disc 6 is loaded or unloaded, a lock mechanism 3 pushes downward the reproduction unit chassis 1, and as shown in FIG. 1C, lifts a disc loading/unloading mechanism 4.

Figure 2:
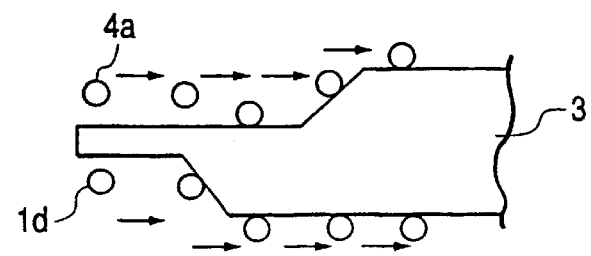
FIG. 2 is a schematic side view of the vehicle mount disc player, illustrating the operation of a lock mechanism.

Locking the reproduction unit chassis 1 and lifting the disc loading/unloading mechanism 4 are performed by the lock mechanism 3 as illustrated in FIG. 2. A relative motion between the lock mechanism 3, a shaft 1d of the reproduction unit chassis 1 and a shaft 4a of the disc loading/unloading mechanism 4 is illustrated in FIG. 2.

For the transition from the reproduction state to the loading or unloading state, the lock mechanism 3 first raises the shaft 1d to lower the reproduction unit chassis 1, and then raises the shaft 4a to lift the disc loading/unloading mechanism 4. For the transition from the loading or unloading state to the reproduction state, the above operations are reversed. With such operations, a wasteful space as in the conventional disc player can be removed in the loading or unloading state and the disc player can be thinned.

Figure 3A:
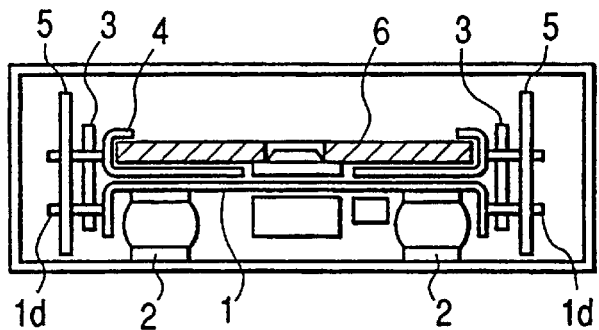
FIGS. 3A and 3B are schematic cross sectional views showing the structure of a vehicle mount disc player according to a second embodiment of the invention.
Figure 3B:
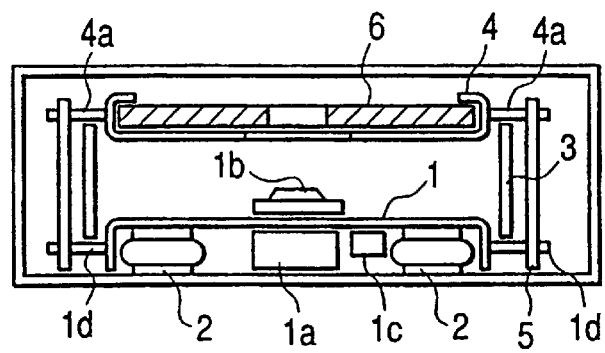

FIGS. 3A and 3B are schematic cross sectional views showing the structure of a vehicle mount disc player according to a second embodiment of the invention. FIG. 3A illustrates a reproduction state of the disc 6, and FIG. 3B illustrates a loading or unloading state of the disc 6. In this embodiment, damper mechanisms 2 support a reproduction unit chassis along an up/down direction. The other structures are the same as those of the first embodiment, and the detailed description thereof is omitted.

Figure 4A:
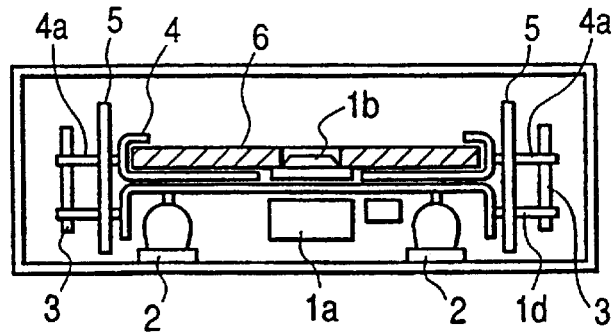
FIGS. 4A and 4B are schematic cross sectional views showing the structure of a vehicle mount disc player according to a third embodiment of the invention.
Figure 4B:
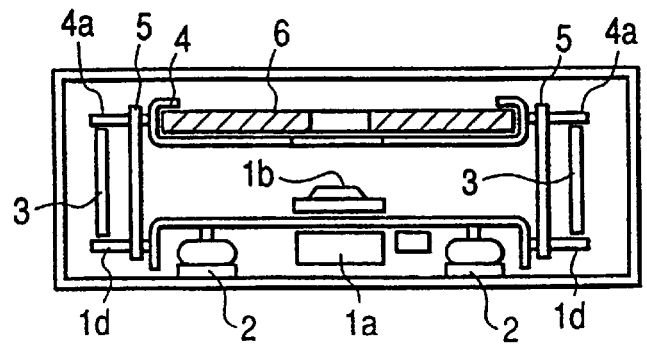

FIGS. 4A and 4B are schematic cross sectional views showing the structure of a vehicle mount disc player according to a third embodiment of the invention. FIG. 4A illustrates a reproduction state of the disc 6, and FIG. 4B illustrates a loading or unloading state of the disc 6. In this embodiment, a lock mechanism 3 is disposed outside of side walls 5 of a main chassis. The other structures are the same as those of the second embodiment, and the detailed description thereof is omitted.

In the above embodiments, a vehicle mount disc player of a lateral mount type have been described. The invention is also applicable to a vehicle mount disc player of a vertical mount type. When a disc is loaded or unloaded, the position of the disc loading/unloading mechanism may not be changed by only pushing downward the reproduction unit chassis.

According to the vehicle mount disc player of this invention, the disc loading/unloading mechanism is separated from the reproduction unit chassis by using a peripheral space near the reproduction unit chassis in the reproduction state. Accordingly, the dead space in the loading or unloading state is not present and the disc player can be made compact. Furthermore, the conventional damper mechanisms can be used and the damper characteristics are not degraded.

Since the mechanical structure can be thinned, a plurality of disc players may by accommodated in a standard container for accommodating a single conventional disc player. Inexpensive electronic components of a large height can be used.

Figure 5:
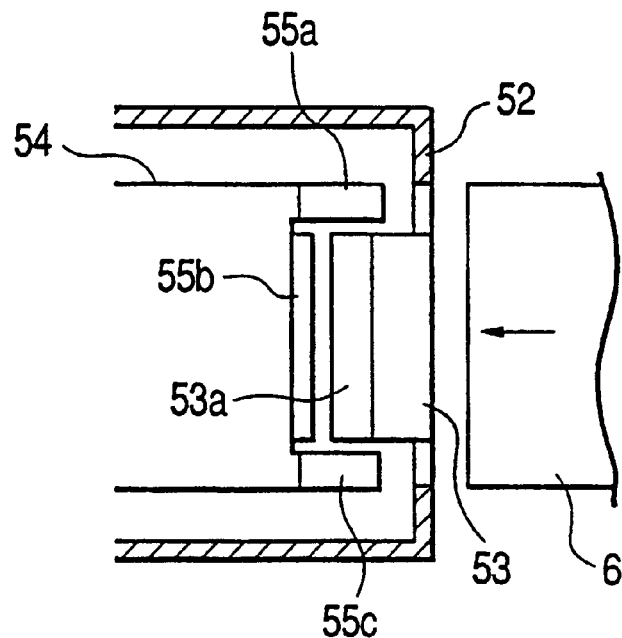
FIG. 5 is a plan view showing the main part of a disc loading/unloading mechanism according to an embodiment of the invention.
Figure 6:
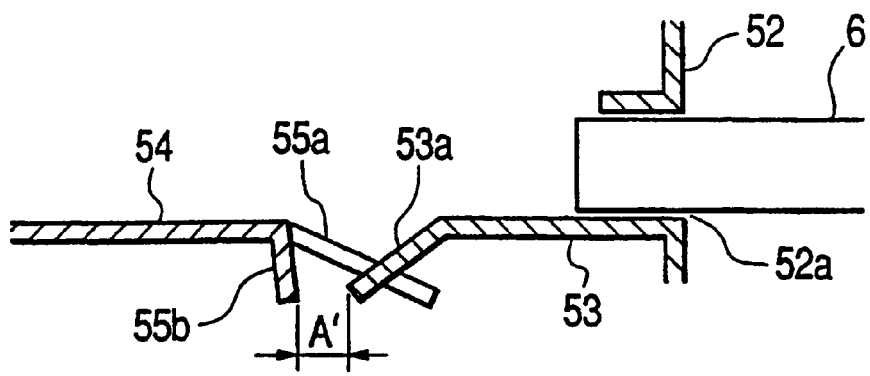
FIG. 6 is an enlarged cross sectional view showing the main part of the disc loading/unloading mechanism.
Figure 9:
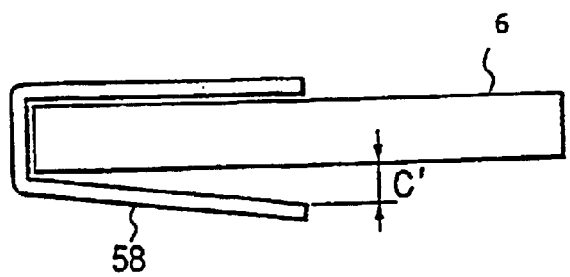
FIG. 9 is a side view illustrating a disc to be loaded or unloaded by the disc loading/unloading mechanism.

A disc loading/unloading mechanism for a vehicle mount disc player according to an embodiment of the invention will be described with referent to FIGS. 5 and 6. FIG. 5 is a plan view showing the main part of a disc loading/unloading mechanism according to an embodiment of the invention, and FIG. 6 is an enlarged cross sectional view showing the main part of the disc loading/unloading mechanism. When this disc loading/unloading mechanism is used, the disc 6 described with the conventional example shown in FIG. 9 is loaded or unloaded.

A disc recording/reproducing unit is supported by a floating chassis (reproduction unit chassis 1) which is supported by a main chassis via damper mechanisms such as shown in FIGS. 1A to 1C. A floating disc guide 54 for guiding the disc is fixed said floating chassis.

A housing (main chassis) 52 has a fixed disc guide 53 extending inward from a disc insert port 52a. The disc 6 inserted into the disc insert port 52a is transported to a recording/reproducing position by an unrepresented feed roller, or the disc 6 at the recording/reproducing position is transported to a position extending outward from the disc insert port 52a.

A fixed disc guide 53 is provided with a slanted guide portion 53a for guiding the disc 6. A floating disc guide 54 is provided with slanted guide portions 55a and 55c at opposite sides and with a slanted guide portion 55b at the central area. An angle between each of the slanted guide portions 55a and 55c and the horizontal plane is smaller than an angle between the slanted guide portion 55b and the horizontal plane. The slanted guide portions 55a and 55c extend overlapping the slanted guide portion 55b in the transport direction of the disc 6. The angle between She slanted guide portion 55b and the horizontal plane is larger than the angle between each of the slanted guide portions 55a and 55c and the horizontal plane, and the end of the slanted guide portion 55b is spaced by a distance A' from the end of the slanted angle portion 53a in order to allow a motion stroke of the floating chassis. The opposite sides of the slanted guide portion 53a are also spaced from the opposing sides of the slanted guide portions 55a and 55c to allow a motion stroke of the floating chassis.

Since the slanted guide portions 53a, 55a and 55b are disposed at the positions overlapping each other along the transport direction of the disc 6, the disc transport length can be shortened and the disc player can be made compact. Since the slanted guide portions 53a, 55a and 55b are disposed at different positions along a direction perpendicular to the disc transport direction, they can be disposed spaced apart by a distance allowing the motion stroke of the floating chassis.

The invention is not limited only to the above embodiment. For example, the slanted guide portions disposed at different positions along a direction perpendicular to the disc transport direction, may be disposed at opposite sides of the fixed disc guide. Any combination of positions along the width direction perpendicular to the disc transport direction may be used. Instead of setting a large slant angle of the slanted guide portion 55b, the length of this portion may be shortened.

According to the disc loading/unloading mechanism of this invention, the slanted guide portions of the fixed disc guide fixed to the main chassis and the floating disc guide fixed to the floating chassis are disposed at overlapping positions along a disc transport direction. Therefore, a disc transport length can be shortened and the disc player can be made compact.

What is claimed is:

1. A vehicle mount player having a reproduction unit chassis supported in a floating state by a main chassis via a damper mechanism, comprising said reproduction unit chassis having a turntable; and a disc loading/unloading mechanism carrying a disc, wherein when a reproduction state is shifted to a loading state or unloading state, said reproduction unit chassis and said disc loading/unloading mechanism in a floating state relative to said main chassis are moved downward in an axial direction of said turntable so as to lock only said reproduction unit chassis with said main chassis, and then said disc loading/unloading mechanism is moved upward in said axial direction.

2. The vehicle mount player according to claim 1, wherein said damper mechanism supports said reproduction unit chassis at sides of the reproduction unit.

3. The vehicle mount player according to claim 1, wherein said damper mechanism supports said reproduction unit chassis at a bottom of the reproduction unit.

4. The vehicle mount player according to claim 3, wherein the locking of said reproduction unit chassis with said main chassis is performed by locking means provided inside of a side wall of the main chassis.

5. The vehicle mount player according to claim 3, wherein the locking of said reproduction unit chassis with said main chassis is performed by locking means provided outside of a side wall of the main chassis.

6. The vehicle mount player according to claim 1, wherein the locking of said reproduction unit chassis with said main chassis is performed by locking means provided inside of a side wall of the main chassis.

7. A vehicle mount player having a reproduction unit chassis supported in a floating state by a main chassis via a damper mechanism, comprising:

said reproduction unit chassis having a turntable; and a disc loading/unloading mechanism carrying a disc, first move means for moving said reproduction unit chassis and said disc loading/unloading mechanism in a floating state relative to said main chassis downward in an axial direction of said turntable, locking means for locking only said moved reproduction unit chassis with said main chassis, and second move means for separating said disc loading/unloading mechanism from said locked reproduction unit chassis to move the separated disc loading/unloading mechanism upward in said axial direction.

8. A vehicle mount player having a reproduction unit chassis (1) supported in a floating state by a main chassis via a damper mechanism (2), comprising:

said reproduction unit chassis (1) having a turntable; and a disc loading/unloading mechanism carrying a disc, wherein when a reproduction state is shifted to a loading state or unloading state, said reproduction unit chassis (1) in a floating state relative to said main chassis is moved downward in an axial direction of said turntable so as to lock said reproduction unit chassis with said main chassis, and then said disc loading/unloading mechanism in a floating state relative to said main chassis is moved upward in said axial direction.

* * * * *